Sept. 9, 1947.    C. H. PETSKEYES    2,427,108
BREAD SLICING MACHINE
Filed June 9, 1945    3 Sheets-Sheet 1
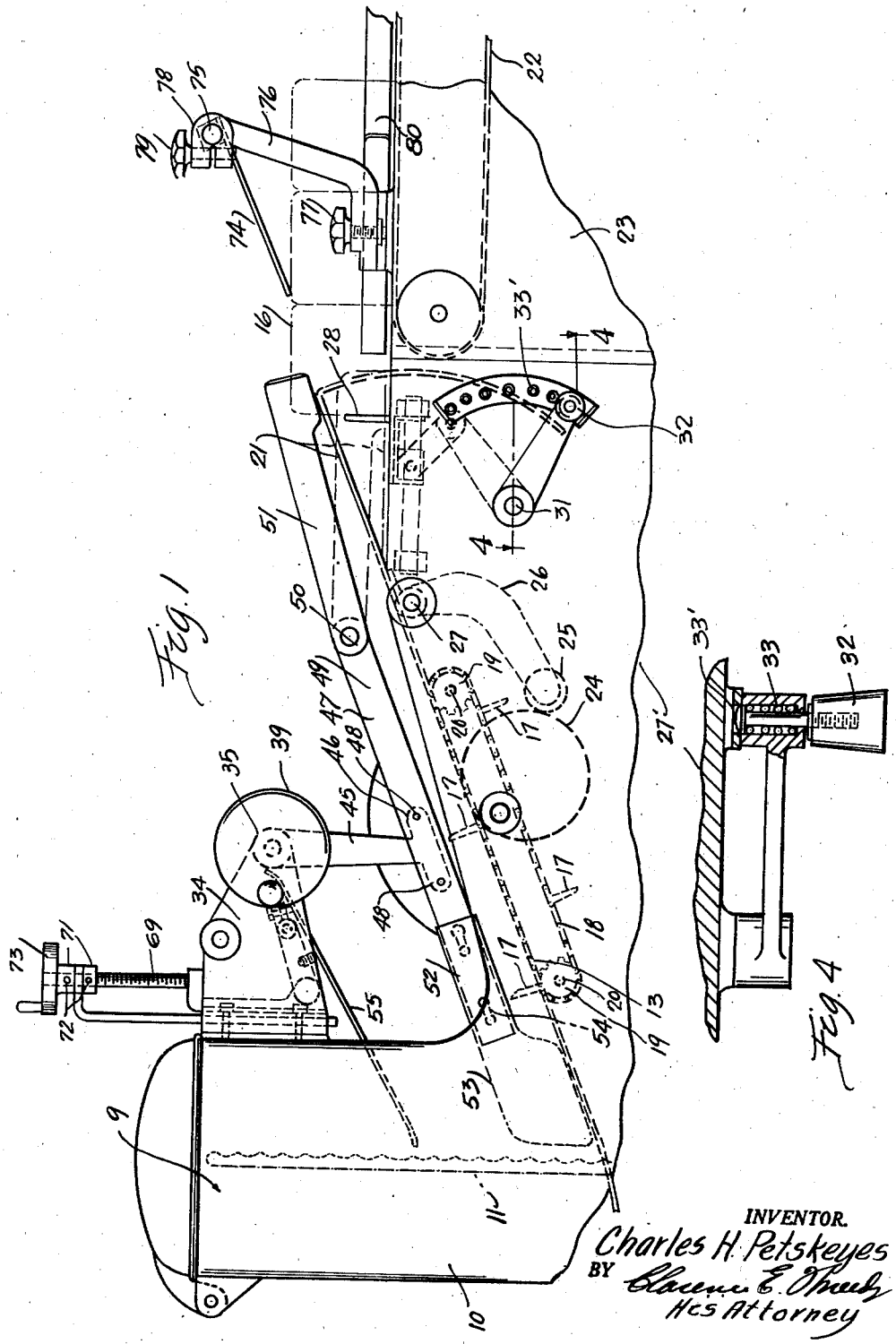
INVENTOR.
Charles H. Petskeyes
BY
His Attorney

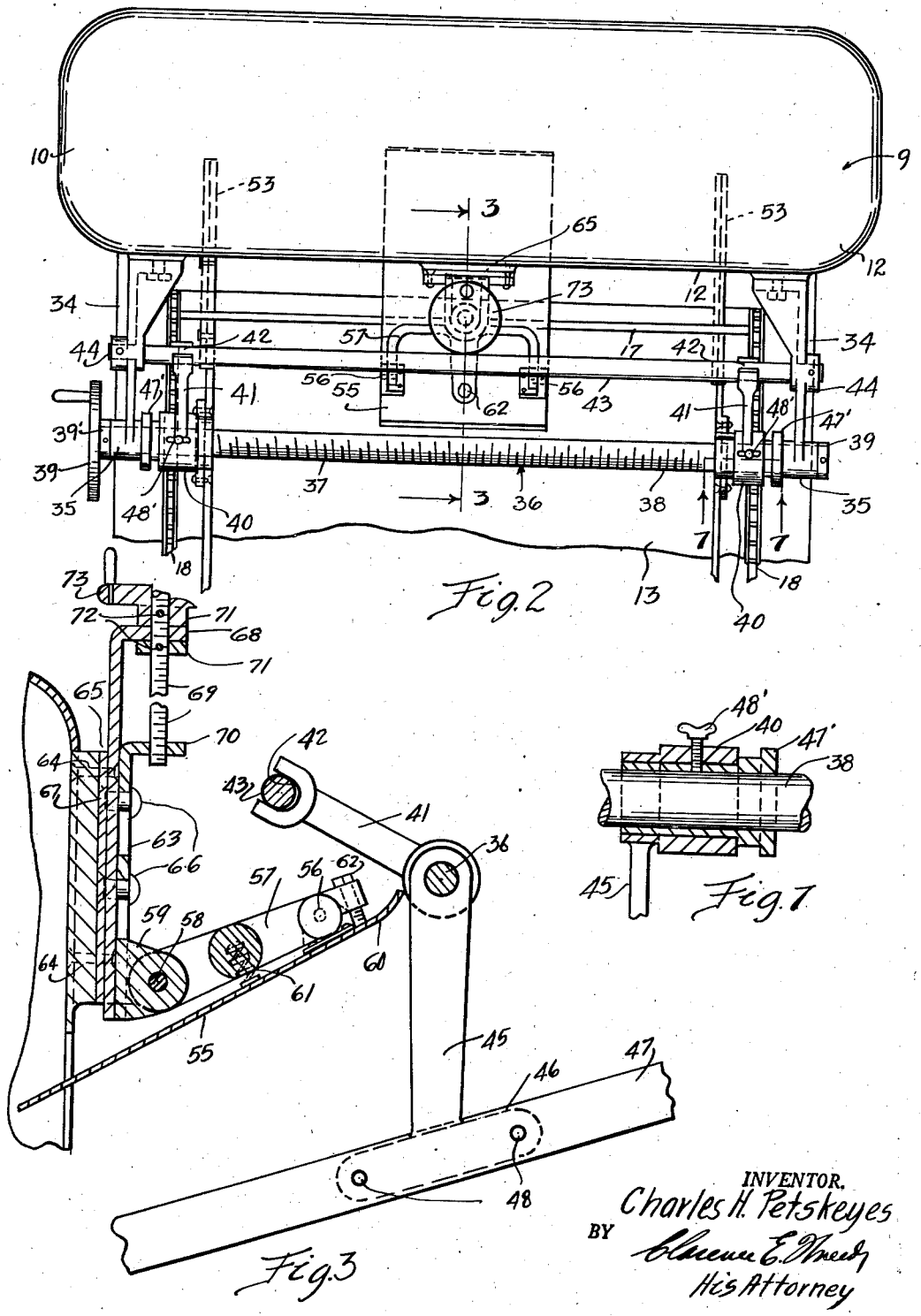

Sept. 9, 1947.  C. H. PETSKEYES  2,427,108
BREAD SLICING MACHINE
Filed June 9, 1945  3 Sheets-Sheet 3

INVENTOR.
Charles H. Petskeyes
BY
His Attorney

Patented Sept. 9, 1947

2,427,108

UNITED STATES PATENT OFFICE 2,427,108

BREAD SLICING MACHINE

Charles H. Petskeyes, Davenport, Iowa, assignor to Gellman Manufacturing Company, Rock Island, Ill., a corporation of Illinois Application June 9, 1945, Serial No. 598,454

1 Claim. (Cl. 198—26)

This invention relates to certain new and useful improvements in bread slicing machines.

The conventional and well known bread slicing machine comprises a plurality of alternating movable slicing knives to which the bread to be sliced is gravitated or fed down a chute between a guiding structure. As the loaves of bread are made in different lengths it frequently requires adjustment of the guiding structure to permit the bread to move without unnecessary friction to the slicing knives, otherwise the bread becomes cramped between the guiding structure and may buckle or be held from feeding down the chute. To allow for this variation in the length of the loaves of bread, the operator in control of the present-day machines must, in order to make proper adjustment in the guiding structure, render the machine inoperative. By this method, considerable time is lost in the bread slicing operation in addition to the danger to which the operator may subject himself while making the adjustments contiguous the bread slicing knives.

This invention therefore has as one of its principal objects the provision of adjusting the guiding structures without stopping the operation of the machine and without interference with the movement of the loaves of bread down the chute to the slicing knives.

A further and equally important object of the invention is to provide means for the above-stated purpose, which will be simple in structure and easy in operation, a structure which may be adjusted by the operator with substantial safety to himself.

Another and equally important object of the invention is the provision of an arrangement for effectively transferring loaves of bread successively from a conveyor to the chute and for retaining the loaves of bread in proper alignment during this transfer and during the slicing operation, without any undue pressure upon the bread.

The invention will be best understood by reference to the accompanying drawings showing the preferred form of construction, and in which:

Fig. 1 is a fragmentary side elevational view of a bread slicing machine showing my invention associated therewith;

Fig. 2 is a fragmentary top plan view of the same;

Fig. 3 is a fragmentary sectional detail view taken substantially on line 3—3 of Fig. 2;

Fig. 4 is a fragmentary sectional detail view taken substantially on line 4—4 of Fig. 1;

Fig. 7 is a sectional detail view taken substantially on line 7—7 of Fig. 2.

Figure 5:
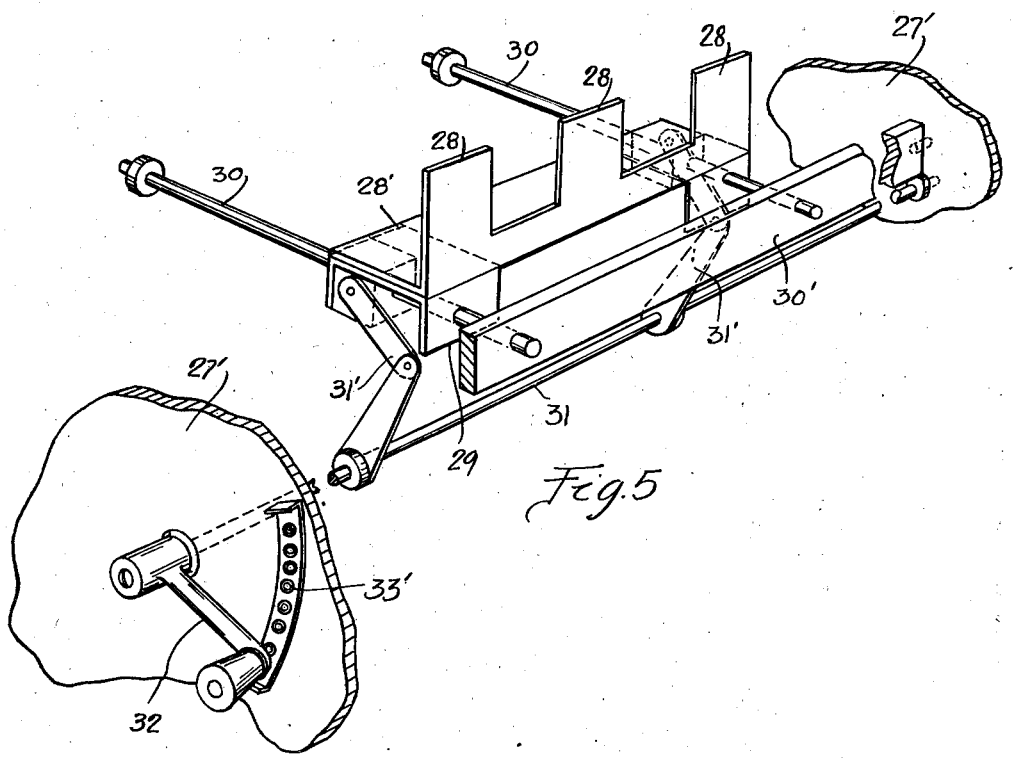
Fig. 5 is a fragmentary perspective view illustrating bread-locating fingers embodied in the invention.

The drawings illustrate the preferred form of construction by which the several objects of my invention are accomplished.

In these drawings, I have illustrated a bread slicing machine 9 showing the invention associated therewith. This bread slicing machine includes a housing 10 within which are arranged the reciprocating slicing knives 11. Leading to the open front 12 of this housing is an inclined chute 13 which delivers the loaves of bread 16 to the knives.

Associated with this chute 13 are follower bars 17 equally spaced from each other and each adapted to cooperate with the chute 13 to move a loaf of bread down the chute 13 to the knives 11. These follower bars 17 are mounted upon sprocket chains 18, and these sprocket chains 18 operate over suitable sprocket gears 19 mounted upon shafts 20 and operated by a suitable main drive (not shown).

The upper end portion of the chute 13 comprises a transfer plate 21 upon which the loaves of bread 16 are conveyed from a belt conveyor 22 supported by a suitable structure 23. This plate 21 is pivoted to a substantial horizontal position as shown in dotted lines to receive the bread from the conveyor belt 22. This is accomplished by means of a cam structure 24 including a cam roller 25 carried by an arm 26 secured to a shaft 27 pivotally carrying the plate 21.

Figure 6:
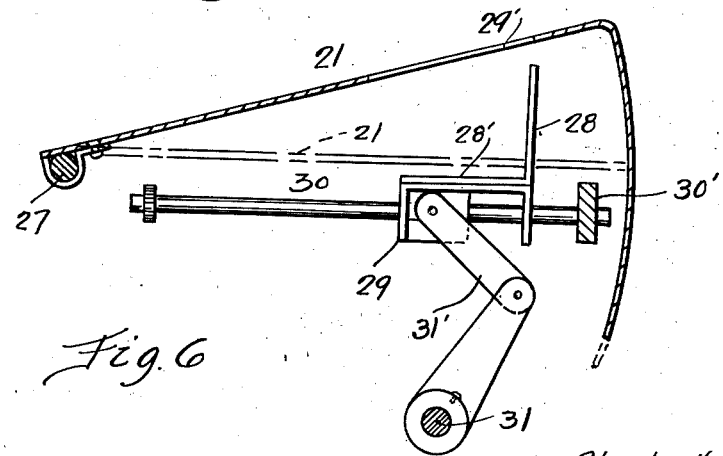
Fig. 6 is a fragmentary side elevational view of the same.

The proper position of the bread 16 upon the plate 21 is governed by a plurality of equally spaced fingers 28 (Figs. 5 and 6). These fingers 28 are part of a plate 28 mounted upon brackets 29 which in turn are slidably supported upon the rods 30. These rods 30 are supported from a bar 30' secured to the side walls 27' of the machine 9.

The mounting brackets 29 are adjusted relative to the rods 30 by means of a handle 32 releasably latched in an adjusted position by means of a detent 33 (Fig. 4) adapted to selectively engage sockets 33'.

The handle 32 is secured to an end portion of a shaft 31 and this shaft is connected to the mounting brackets 29 by pairs of links 31' (Fig. 5).

The transfer plate 21 has slots 29' formed therein for the projection of the fingers 28 when the plate 21 is in a horizontal position as shown in Fig. 1, (see Fig. 6).

Secured to the opposite sides of the housing 10 are bracket structures 34, the ends of which terminate into suitable bearing structures 35 rotatably supporting a screw shaft 36 having right and left-hand screw threads 37 and 38 respectively and rotatably held in place by collars 39'. This screw shaft 36 is rotated (Fig. 2) by means of a hand wheel 39.

Movable longitudinally upon the screw shaft 36 are bearing sleeves 40. These bearing sleeves 40 have extending therefrom spaced arms 41. These arms 41 are bifurcated as at 42 for engagement with a guide rod 43. This guide rod is supported between mounting brackets 34, with opposite end portions thereof positioned in the bearing 44 of such mounting brackets.

Depending from the bearing sleeves 40 are supporting arms 45. These supporting arms 45 have their end portions 46 connected as at 48 to guide rails 47. The forward end portions 49 of these guide rails are pivotally connected as at 50 to guide arms 51 which rest upon the plate 21 and are pivoted therewith to properly guide bread 16 from the belt 22 to the plate 21. The opposite end portions 52 of these side rails are detachably connected to guide plates 53 by means of slot and bayonet connections 54. These arms 51 function to guide the loaves of bread 16 to the reciprocating knives 11 as the loaves of bread move down the chute 13.

In the course of the bread slicing operation by a machine constructed in accordance with the foregoing description, it frequently happens that the bread in its movement toward the knives 11 when conveyed down the chute 13, in bearing against the knives 11, has a tendency to buckle or raise upwardly. To prevent this, I provide an adjustable shield 55. This shield 55 is pivotally connected as at 56 to a supporting arm 57 in turn connected as at 58 to a pair of lugs 59. Engaging the end of the shield 55 inwardly from the end portion 60 is a spring 61 that normally tends to pivot the shield 55 against an adjustment screw 62 engaging the outer extremity of the end portion 60. By adjusting this screw 62, the pressure of the shield 55 upon the bread as it is passed to the knives may be varied.

The lugs 59 are formed as an integral part of a plate 63 adjustably connected to a bracket 65 by means of slot and pin connections 66, the bracket 65 being in turn connected as at 64 to an enlargement 67 of the front wall of the housing 11. This plate 63 at its upper end portion provides a lateral extension 68, into which is a threaded shaft 69. This threaded shaft 69 passes through a lateral extension 70 formed on the plate 63. On opposite sides of this lateral extension 70 the shaft 69 carries collars 71 which are fixed to the shaft 69 as at 72. The upper of these collars 71 is formed as an integral part of a hand wheel 73. By rotating the hand wheel 73, the shaft 69 will be rotated and the plate 63 may be vertically adjusted so as to elevate or lower the shield 55 to compensate for the change in height of the loaves of bread.

As shown in Fig. 1, a pressure plate 74 is provided which bears upon the top surfaces of the loaves of bread 16 as they are conveyed by the belt 22 to the plate 21. This pressure plate is connected to a shaft 75 supported between brackets 76 secured to the structure 23 as at 77. Each end of the shaft 75 is journaled in a split bearing 78 clamped together by a hand screw 79, the arrangement being such that the plate 74 may be adjusted in a proper position for engagement with the tops of the loaves of bread 16. This plate 74 prevents the bread from being forced upwardly or otherwise disturbed from between the guide 80 carried by the supporting structure 23.

In the operation of a bread slicing machine constructed in accordance with the description hereinbefore set forth, it is apparent that all adjustment may be made without stopping the operation of the machine. For example, should it be found that the guide rails 47 are too far apart, they can be readily adjusted to proper relation with the bread by simly rotating the hand wheel 35. In this connection it will be noted that the hand wheel 35 is located away from the knives thus making it safe to adjust the rail 47.

The pressure of the plates 55 and 74 may likewise be adjusted in proper relation with respect to the loaves of bread.

An important feature of my invention resides in the fact that the guide rails 47 may be simultaneously adjusted or be adjusted independent of each other. This latter adjustment is permitted by the fact that each bearing sleeve 40 is carried by a flanged sleeve 47' threaded upon the screw shaft 36. When simultaneous adjustment is desirable the bearing sleeve 40 and the flanged sleeve are connected together by a thumb screw 48'. When individual adjustment of the rails 47 is desirable the thumb screw 48' is loosened to permit the adjustment of the flanged sleeve 47' upon the screw shaft 36. In this adjustment of the flanged sleeve 47' the bearing sleeve will move therewith. Thus, in this manner the rails 47 may be simultaneously or individually adjusted to compensate for the various lengths of the loaves of bread to be sliced.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In combination a pair of fixedly supported parallelly extending spaced rod elements, means for fixedly supporting said elements, a member slidably supported by said rod elements and positioned therebetween for longitudinal movement with respect thereto and comprising vertically extending stop fingers, a rocker shaft, means supporting said rocker shaft, toggle connections between said rocker shaft and said slidable member, means for rocking said shaft to shift said member longitudinally of said rod members, a tiltable plate upon which an article is adapted to be moved, means for tilting said plate from a horizontal-article receiving position to a position inclined in respect to said horizontal article-receiving position, said plate having slots formed therein through which said fingers project when said plate is tilted to said horizontal article-receiving position.

CHARLES H. PETSKEYES.

REFERENCES CITED

The following references are of record in the file of this patent:

UNITED STATES PATENTS

| Number | Name | Date |
| --- | --- | --- |
| 845,152 | Weir | Feb. 26, 1907 |
| 2,022,877 | Bettendorf | Dec. 3, 1935 |
| 2,131,256 | Petskeyes | Sept. 27, 1938 |
| 2,245,108 | Kottmann | June 10, 1941 |
| 2,379,911 | Kottmann | July 10, 1945 |